Jan. 9, 1940.　　　　T. HARRIS　　　　2,186,696
ROVING FRAME
Filed April 19, 1937　　　9 Sheets-Sheet 5

INVENTOR.
Thomas Harris
BY Barlow & Barlow
ATTORNEYS.

Jan. 9, 1940.　　　　T. HARRIS　　　　2,186,696
ROVING FRAME
Filed April 19, 1937　　　9 Sheets-Sheet 7

Fig. 8.

INVENTOR.
Thomas Harris
BY Barlow & Barlow
ATTORNEYS.

Jan. 9, 1940. T. HARRIS 2,186,696
ROVING FRAME
Filed April 19, 1937 9 Sheets-Sheet 9

INVENTOR.
Thomas Harris
BY Barlow & Barlow
ATTORNEYS.

Patented Jan. 9, 1940

2,186,696

UNITED STATES PATENT OFFICE 2,186,696

ROVING FRAME

Thomas Harris, Providence, R. I., assignor to Harris Textile Machinery Corporation, a corporation of Rhode Island Application April 19, 1937, Serial No. 137,683

25 Claims. (Cl. 57—54)

This invention relates to roving or fly frames; and has for one of its objects the provision of a roving frame construction in which the flyers are mounted independently of and fixedly positioned above the bobbins and to provide a driving mechanism therefor for simultaneously rotating a pair of flyers as a unit.

Another object of the invention is to provide a roving frame of the above mentioned character in which the bobbins are arranged for swinging movement laterally forwardly of the machine either individually or in unison to an angularly offset position to permit freedom of piecing up or doffing.

Another object of the invention is to provide means independent of but cooperating with the bobbin traverse mechanism for manually lowering all the bobbins simultaneously to a position well removed from the flyers for doffing purposes.

Another object of the invention is to automatically provide slack in the yarn when the bobbin is moved to an outward angular position for piecing up the yarn after doffing.

Another object of the invention is to improve the bobbin and flyer mechanism of roving, fly or spinning frames.

Another object of the invention is to simplify and make more convenient the manipulation of one of the cone pulleys through which the drive of the bobbins is had.

With these and other objects in view, the invention consists of certain novel features of construction, as will be more fully described, and particularly pointed out in the appended claims.

In the accompanying drawings:

Fig. 3 is an end elevation of my improved roving frame showing the head end driving gearing and to which my invention is applied;

In the usual construction of roving or fly frames, the bobbins are slidable and revolve on the rotatable driving spindles carrying the flyers, and a traverse or lifting rail is provided by which the bobbins are simultaneously raised or lowered with reference to the flyer spindles in accordance with the vertical rising or falling movement of the traverse rail by the usual builder motion as the bobbins are being given a variable rotative motion on the flyer spindles. According to the present invention, I have found it to be of advantage to support the bobbins independently of the flyers and to employ a construction in which there is provided a plurality of pairs of flyers with means for rotating the flyers each about its own axis and positively driven from the top end thereof, and to this end I have provided a construction wherein the bobbins and flyers or other twisting devices are co-axially arranged in an opposed relationship and in which they may be relatively traversed towards and from each other. Also, it is found of advantage to rotate the flyers without axial movement and to cause the bobbins to move up and down within the flyers by vertical reciprocation automatically by the usual power driven builder motion; and in addition to provide means for the purpose of lowering the bobbins, either individually or in unison, to a predetermined doffing position beyond the usual maximum lowermost positions of vertical traverse reached when lowered thereto by the ordinary power driven builder mechanism of the machine, so as to permit the bobbins to be doffed freely; and I further provide driving means for the bobbins adapted to not only maintain continual driving engagement therewith as they rise and fall in step with the variable traversing motion given to the rail upon which the bobbins are carried but will also permit the bobbins to be swung outwardly to an inclined position when lowered to permit doffing; and means are also provided which co-act with the usual bobbin driving means for causing rotation of the bobbins by the latter in a direction opposite to their normal rotation and actuated simultaneously with the means for lowering the bobbins to their proper doffing position and simultaneously with their swinging whereby slack will be provided in the yarn or roving; and the following is a more detailed description of the present embodiment of this invention, illustrating the preferred means by which these advantageous results may be accomplished:

With reference to the drawings, 20 designates the head or driving end casing for enclosing the operating gears and supporting the fixed portions of the framework of the machine, the parts shown comprise the top rail 21, intermediate samsons 22, and a bottom rail 23 which extends horizontally and is secured to the samsons to stiffen the same. Suitably journaled in the head 20 is the main drive shaft 25 which has mounted on its outer end the usual fast and loose pulleys 26 and 27, respectively, by which the drive shaft 25 is driven from any suitable source of power. The drive shaft 25 extends within the framework of the machine in a longitudinal direction thereof and has mounted upon it the gear 28 and the usual differential or "compound", which will hereinafter be more fully described. The gear 28, which is termed the "twist" gear, is detachably mounted on the end of the drive shaft 25 and through the carrier gear 29 and gear 30 communicates its rotation to the shaft 31 on which is fixed the usual upper or "top" cone 32. The drive shaft 33 of the front line of drawing rolls 34, is driven from the shaft 31 by a train of gears 190, 191, shaft 192, and gears 193, 194, 195, 196, which may be conveniently located such as being enclosed within the head or casing 20.

A lower cone 50 is driven from the upper cone 32 by means of the belt 56 which may be gradually moved along the entire length of the cones from the larger end of the upper cone to the smaller end thereof, and correspondingly from the smaller end of the lower cone to the larger end thereof during the filling of the bobbins by some suitable means which is here indicated as a rack 57, having a bifurcated bracket at its end to engage the belt. This rack is actuated by the ordinary builder mechanism, not shown, the rack being given a slight forward movement upon each change of direction of the vertical traverse of the bobbins as they rise and fall with the traverse rail in a known manner. Rotary motion is transmitted from the lower cone through the gears 51, 52, 53, 54 and 55 to the gear 49 at one end of the double gear 47 which has a bevel gear 48 at the other end thereof. This bevel gear 48 drives the gear compound 36 through the differential mechanism comprising a cross shaft 44 mounted in a boss 43 and provided with a bevel gear 46 meshing with the gear 48, at one end of this cross shaft; and a bevel gear 45 meshing with the bevel gear 37, at the other end of the cross shaft 44. The gear 38 on the opposite end of this compound 36 drives the gear 40 which is fixed on the shaft 41 which extends longitudinally along the front side of the frame and serves to supply rotary motion to the spindles 10 of each of the bobbin units through the various spiral gears 70, as will be more fully described.

Figures 6, 7, 9, 10, 11:
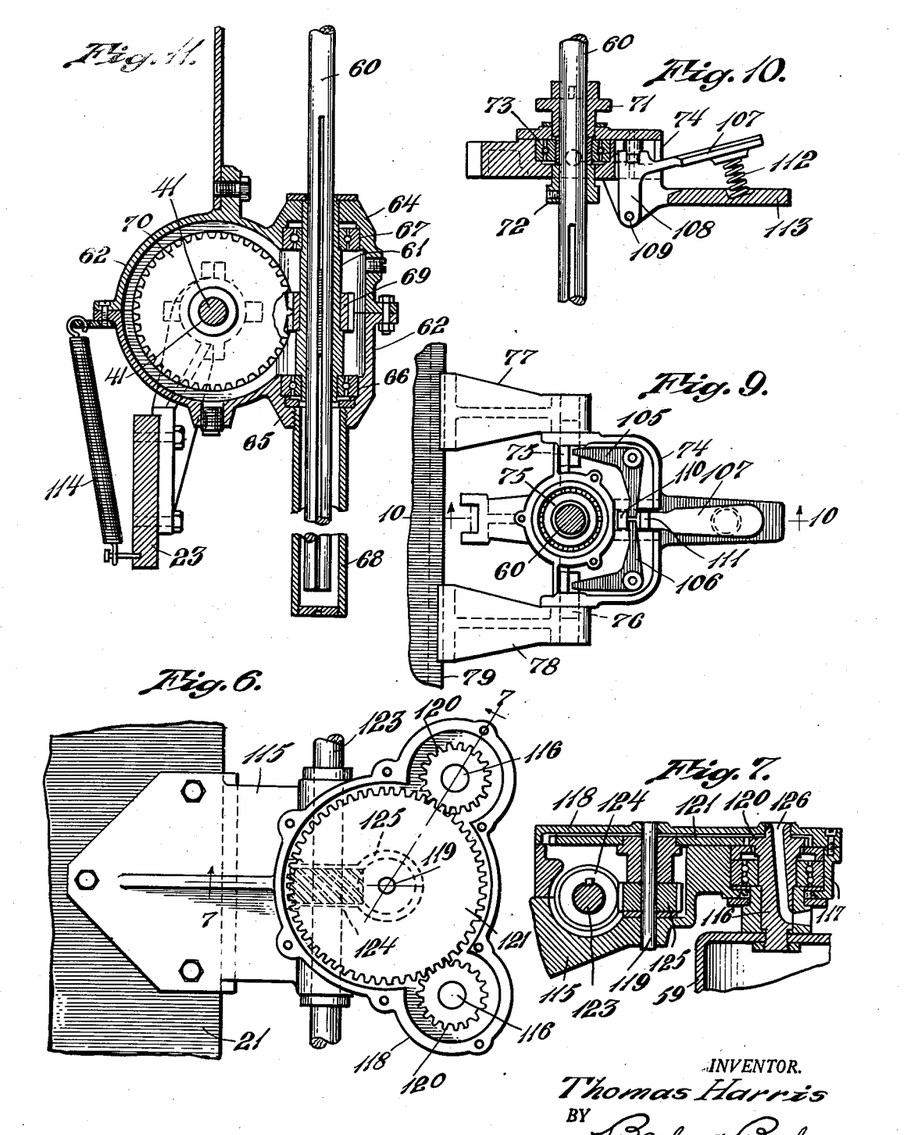
Fig. 6 is an enlarged plan view, partly in section, of one of the cap driving units which is supported on the fixed framework of the roving frame for simultaneously driving a pair of flyers and taken on the line 6—6 of Fig. 5.
Fig. 7 is a vertical sectional view taken on the line 7—7 of Fig. 6.
Fig. 9 is a plan view, partly in section, and taken on the line 9—9 of Fig. 8.
Fig. 10 is a vertical sectional view taken on the line 10—10 of Fig. 9.
Fig. 11 is an enlarged vertical sectional view of my improved form of bobbin mechanism showing the driving arrangement therefor and taken on the line 11—11 of Fig. 1.

As shown in Figs. 1, 5, 6 and 7, the cylindrical flyers 59 are mounted over the bobbins 35 and are arranged with their axes vertical. The lower end of the flyer 59 is open and adapted for receiving the bobbins 35 as they are lifted during winding of the yarn thereon. The top end of the flyer 59 is closed and is attached to the lower end of a spindle 116 journaled in an anti-friction bearing 117 fixed in the casing 118 which is attached to the rail 21 by a bracket 115, as shown in Figs. 6 and 7. As there illustrated, a pair of flyers 59 are located at the opposite front corners of the casing 118 and in an angularly disposed relation with respect to a central drive shaft 119 vertically arranged in the casing 118. At the top end of the spindle 116 of each of the flyers 59 is a pinion gear 120 which meshes with a large spur gear 121 fast on the shaft 119 so that the latter gear thus serves as a common driver for the gears 120 of a pair of flyers 59. The gear 121 is enclosed by the casing 118 and is driven from a main drive shaft 123 by gears 124 and 125 respectively. The shaft 116 is provided with a suitable passageway 126 for the yarn and extending lengthwise therealong with a convenient side exit opening adjacent to the top ends of the flyers 59 for the yarn to be led outwardly along a groove in the top of the flyer and into the guide and thence through the eye in the arm 127' to the bobbin. The main drive shaft 123 for these flyers is arranged longitudinally of the machine and has one end passing into the driving head 20 where it is driven by means of suitable gearing, such as a gear train consisting of gears 127, 128, 129 and 130 which receive their rotative motion from the main drive shaft 25. It will thus be apparent that the flyers 59 although rotatably mounted on the framework of the machine do not participate in any vertical reciprocating movement but that the bobbins 35 partake of such up and down movement during the winding operation.

The bobbins 35 are separately supported independently of the flyers 59 to move into or out of the cylindrical flyers. To this end each of the yarn receivers or bobbins 35 is mounted on a vertical spindle 60 the lower end portion of which is provided with a suitable spline to permit vertical reciprocation thereof within an elongated sleeve 61 which is journaled in a housing 62, see Fig. 11. Formed integrally with the housing 62 are the cylindrical bosses 64 and 65 respectively, and which extend vertically and outwardly therefrom in axially opposite directions. The end portions of the sleeve 61 are rotatably mounted within suitable ball bearing members 66 and 67 respectively which are disposed within the bosses 64 and 65 and close to their base portions. Depending from the bottom end of the boss 65 is a housing 68 which has threading engagement with boss 65 and is designed for receiving the lower portion of the splined shaft 60 as the latter descends to its various lowered positions of traverse or to its extreme maximum drop during doffing. The housing 68 also serves as a container for lubricant, such as grease or semi-fluid substances employed for lubricating the sliding spindle 60.

In order to provide a driving means for the bobbin spindle 60 as the latter rises and falls, a spiral or helical gear 69 is mounted upon the body portion of the sleeve 61 and meshes with a larger spiral or helical gear 70 fast on the main bobbin drive shaft 41, thus serving to communicate the rotation of the latter to each of the bobbin spindles 60 and consequently impart rotary motion to the bobbins 35.

In order to obtain vertical traversing motion of the bobbins to permit building of the bobbin the upper portion of the bobbin spindle 60 is provided with a pair of spaced collars 71 and 72 fixed thereon and between which is mounted an antifriction bearing 73, the outer raceway of which is fixedly mounted in a casing 74. A pair of retractile pins 75 and 76 mounted in diametrically opposed relation extend into suitable holes in the brackets 77 and 78 respectively, which brackets are fixedly secured on the side of the traverse or lifting rail 79 attached to the vertical traversing reciprocable carriage 80, actuated by the usual builder motion to cause the rail 79 and the bobbins 35 to rise and fall as a unit. The carriage 80 consists of a series of slide members 81 which are arranged for vertical movement in suitable channel-ways formed in the marginal sides of the samsons 22, as is customary in the art, and the slide members 81 being arranged for movement with a varying vertical traversing movement by the reciprocatory motion of the usual rack 84. A pinion 85 fast on the shaft 86 which extends longitudinally of the machine serves to actuate the several racks 84 up and down, the shaft 86 receiving its rotative motion from the train of gears 87, 88, 89, 90, 139, 140, 141 and 138, alternately driven in opposite directions by means of the usual twin gears 91 and 92 which are of well known construction. A gear train composed of gears 93 and 94 serves to drive the twin gears, the gear 94 receiving its rotative motion from the carrier gear 54 of the gear train which is driven from the bottom cone 50 and used for driving the compound gear 36. Thus, the traversing speed progressively decreases as the package builds up.

The gear 90 is loosely mounted upon the shaft 86 while the gear 138 is fixed on the shaft 86. A yoke 135 is also freely mounted on shaft 86 and carries the gears 139, 140 and 141 which serve to transmit motion from the gear 90 to the gear 138 and thus cause a drive of the shaft 86.

In order to assist in piecing up of the ends of the individual yarn receivers or bobbins 35 the arrangement is so designed that each of the bobbins may be swung, either individually or in unison, in a direction outwardly from the carriage 80 and to an inclined position with respect thereto, preferably when the bobbin is at its extreme lowermost position of its downward travel. The means for imparting outward swinging motion to a single bobbin 35 independently of the other bobbins on the rail 79 is by means of mechanism distinct from the means to move these together. To this end, I have shown in Figs. 9 and 10 a detachable connection with the brackets 77 and 78 by means of the retractile pins 75 and 76, which are respectively actuated by means of bell crank levers 105 and 106 to cause disengagement of the pins 75 and 76 and permit the casing 74 together with the spindle 60 to drop from between the brackets 77 and 78 and be tilted outwardly about the main bobbin drive shaft 41 as a center, to the position shown in Fig. 8. In order to release the pins 75 and 76 there is provided a spring pressed lever 107 having a depending member 108 the lower end of which is pivotally mounted by a pivot pin 109 on the casing 74 for swinging movement thereon. Formed on the top portion of the lever 107 and upstanding therefrom are the spaced lugs 110 and 111 and into the space therebetween extends the ends of the inner arms of the bell crank levers 105 and 106. A suitable compression spring 112 interposed between the undersurface of the outer end of the lever 107 and the inner face of an extension 113 of the casing 74 serves to maintain the pins 75 and 76 engaged within the holes in the brackets 77 and 78 for locking the bobbin spindle 60 in a vertical position and secured to the rail 79. It will thus be seen that any squeezing action caused by gripping the lever 107 will serve to cause inward movement of the outer arms of the bell crank levers 105 and 106 to retract the pins 75 and 76 and thereby release the spindle 60 from the brackets 77 and 78 to permit the spindle and the bobbin carried thereby to drop and be tilted about the main drive shaft 41 into a doffing position. A bar is bolted to the casing and extends upwardly so as to engage the rail 79 when the spindle is swung to vertical position to locate this position and align the pins 75 and 76 with their opening in the brackets 77 and 78 for locking them in position. A coiled spring 114 having its ends connected to the housing 62 and the bottom rail 23 also normally tends to hold the spindle receiving portion of the housing 62 and the spindle 60 in a vertical position.

Figure 1:
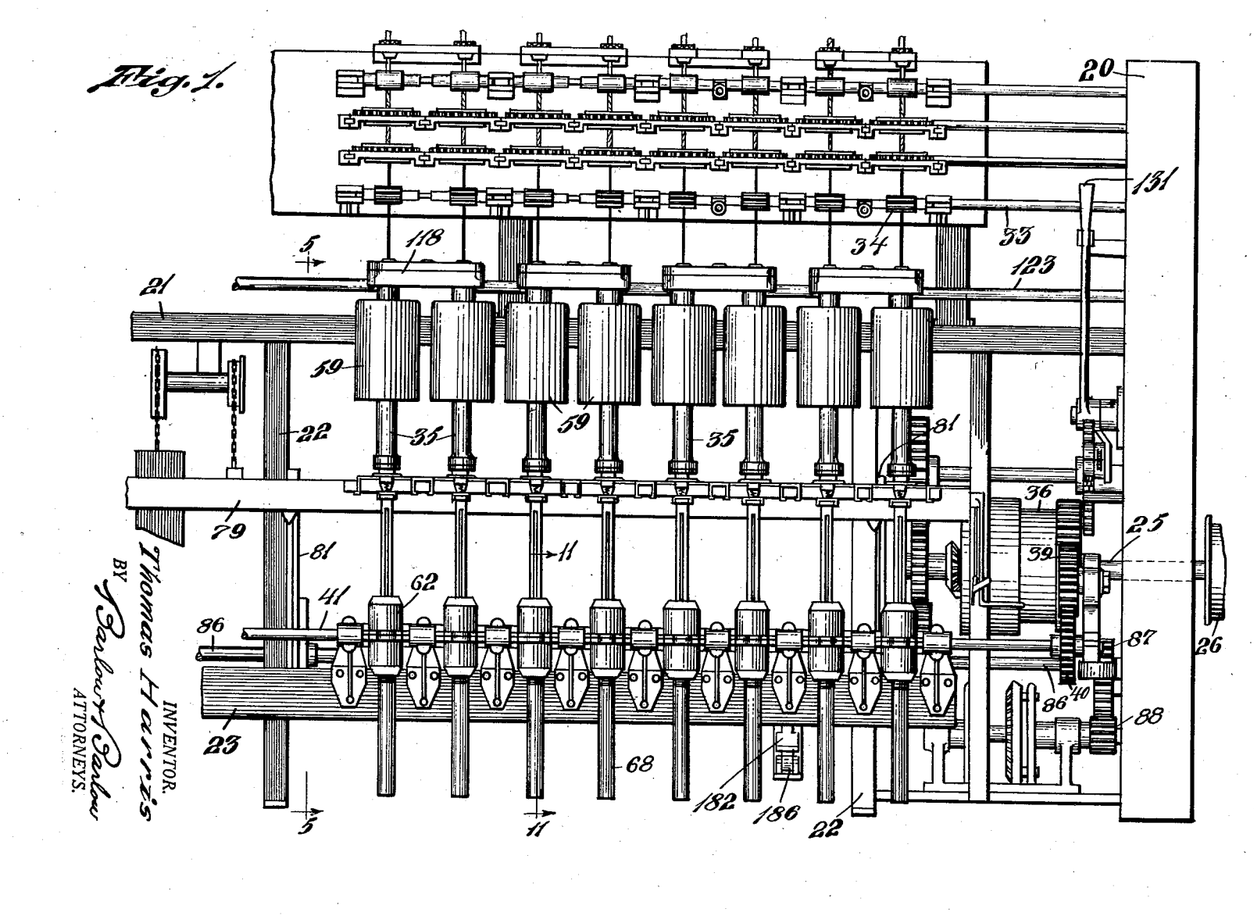
Fig. 1 is a front elevational view of a roving frame constructed in accordance with my invention.
Figure 2:
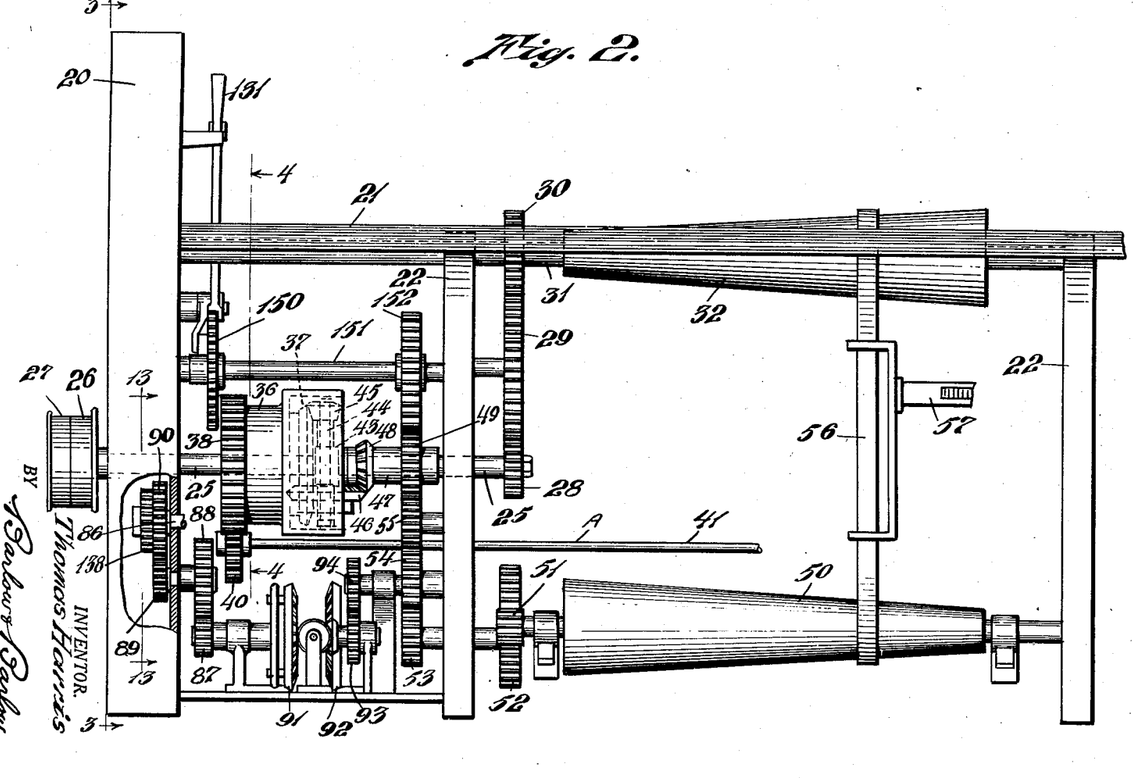
Fig. 2 is a rear elevational view of a portion of the roving frame construction illustrated in Fig. 1 and showing part of the framework and general driving gearing employed for its operation.
Figure 4:
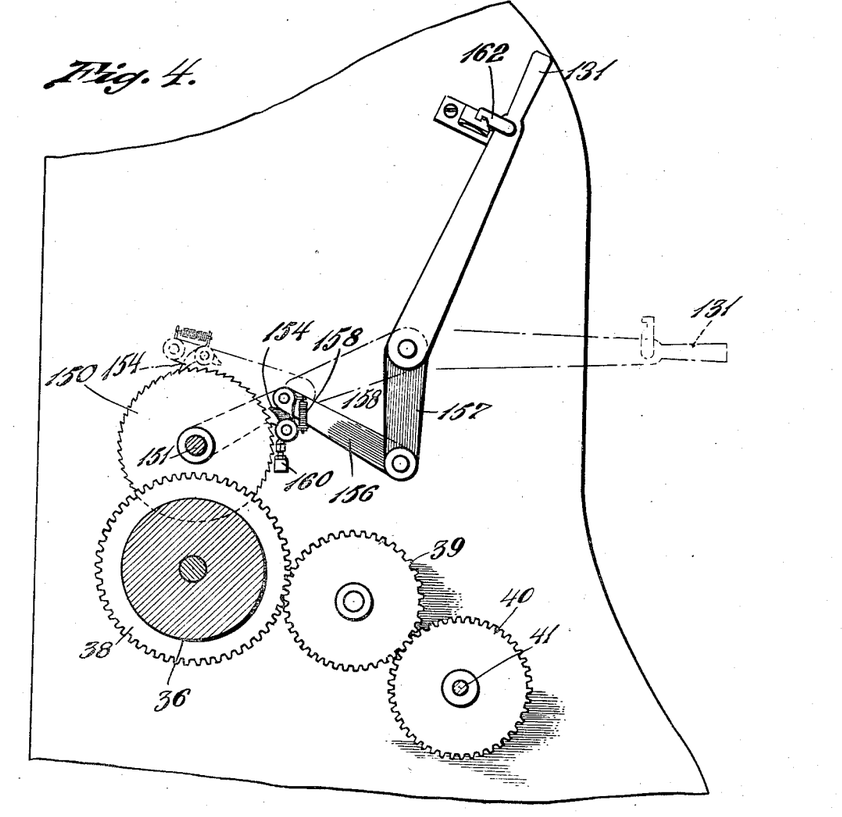
Fig. 4 is a fragmentary detail view, partially in section, and taken substantially on the line 4—4 of Fig. 2.
Figure 5:
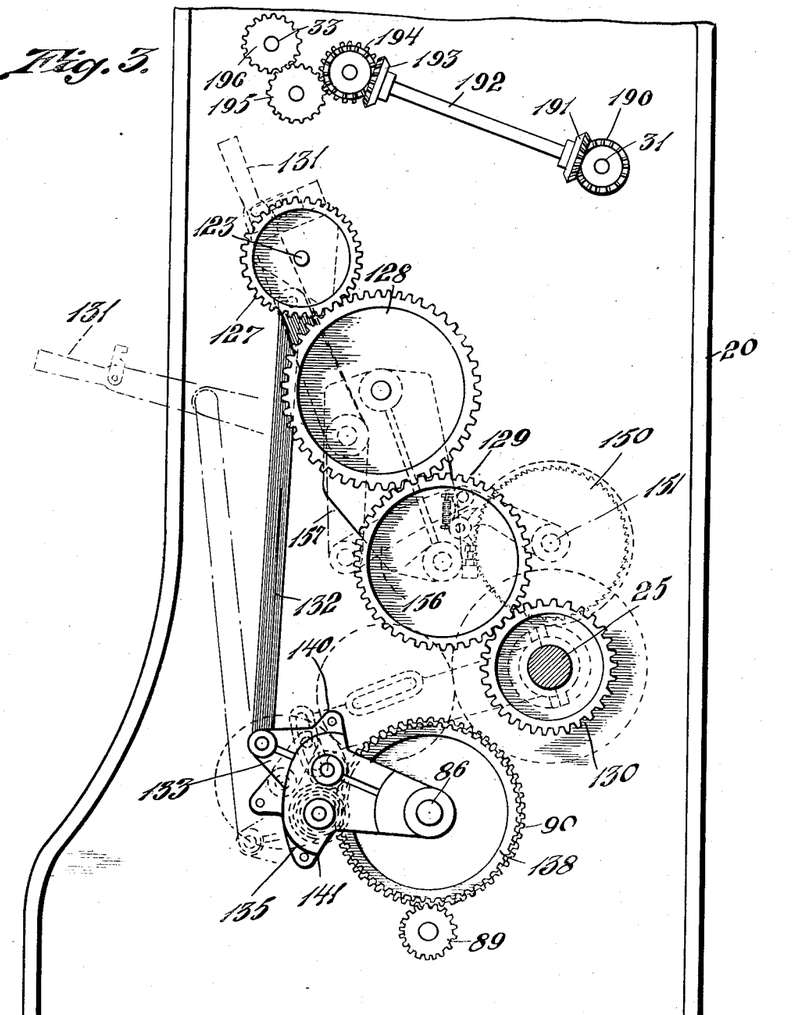
Fig. 5 is an enlarged detail view, partly in section, showing my improved flyer and bobbin mechanism and taken on the line 5—5 of Fig. 1.
Figures 5, 13, 14:
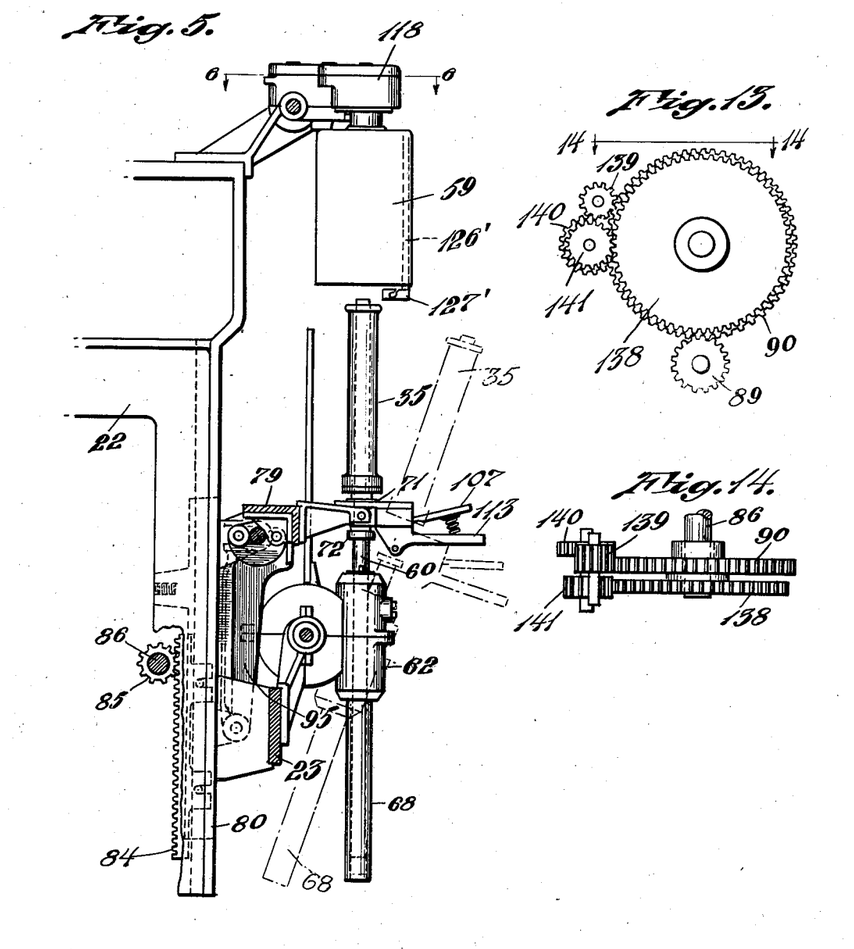
Fig. 13 is a diagrammatic view in elevation of the driving gearing for lowering the bobbins to permit swinging to a doffing position.
Fig. 14 is a diagrammatic plan view taken on the line 14—14 of Fig. 13.

In order to lower all of the bobbins 35 at one time to a predetermined position for doffing, I have provided manually operable means for simultaneously moving all the bobbins 35 in unison so as to lower them to a doffing position beyond the maximum lowermost position of their traverse by the usual power driven builder motion, and thus effect a complete withdrawal of the bobbins 35 from the interior of the flyers 59 so that the tops of the bobbins will be free from interference with the bottom ends of the flyers 59 to permit outward swinging movement of the bobbins 35. To this end, I have provided a lever mechanism consisting of a hand lever 131 pivotally mounted on the head or driving end 20 of the machine for rocking movement thereon in a vertical plane. Pivoted to an intermediate portion of the lever 131 is a link member 132 the lower end of which is pivotally connected to a bracket 133 fixed on the top face of a yoke 135 which is swivelly mounted on the outer end of the shaft 86 which extends through the inner wall of the driving head 20 and along the length of the frame. The gear 90 is loose on shaft 86, while gear 138 is fixed thereon. As shown in Fig. 14, the gear 90 is of a larger diameter than the gear 138 and turns in a direction opposite to gear 90 by being driven through gears 139, 140 and 141. During the doffing operation when the machine is stopped the gear 90 acts in a capacity of a stationary circular rack and the bobbins 35 thus may be lowered simultaneously to a lower position beyond that at which they have been traversed by the normal power driven builder motion, and this result is obtained by swinging the lever 131 downwardly to the position shown in dotted outline in Fig. 3, thereby causing yoke 135 to be rocked about the shaft 86 in a downward direction to rotate the pinion gears 139, 140 and 141 by means of which the gear 138 and the shaft 86 are simultaneously rotated to effect traversing of the rack 84 and thus lower the rail 79 and all the spindles 60 carried thereon to an extreme low position whereby the tops of the bobbins 35 will be free for outward tilting movement to a doffing position. It will be obvious that the cone belt 56 must be slackened on the cones 32 and 50 before manually lowering the rail 79.

Figures 15, 16, 17:
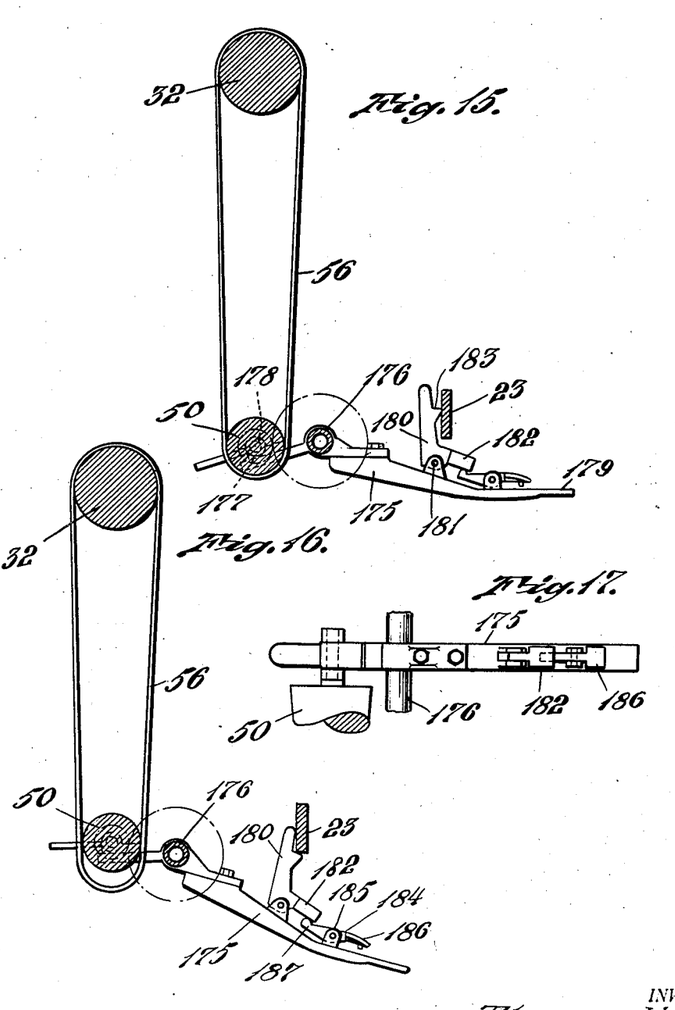
Fig. 15 is a sectional view through the cones which transmit drive to the bobbins and showing the treadle control therefor.
Fig. 16 is a view similar to Fig. 15 showing the cone in belt releasing position.
Fig. 17 is a plan view of the treadle and a fragmental portion of the lower cone.

This slackening of the belt 56 may be had by reason of a lever 175 which is pivoted about a rod 176 and is secured to the bearing 177 for the shaft 178 of the cone 50, while the forward end of this lever extends beneath the operating parts of the machine and is of a sufficient length to provide a foot-engaging portion 179 located in the front of the machine at a point adjacent to the position of the operator when manipulating the lever controls, such as lever 131. By this arrangement in order to loosen the belt 56 it is merely necessary for the operator to step on the foot portion 179, thus moving the lever 175 downwardly about 176 as a pivot to lift the cone pulley 59 into the position shown in Fig. 16. When the lever is moved to lowered position a latch 180 pivoted as at 181 on the lever 175 is so weighted by means of an enlarged portion 182 that its notch 183 swings into a position to engage beneath the horizontally extending frame member 23 so as to hold the lever in downward position, as shown in Fig. 16. If it is desired to release the lever from this lowered position it is merely necessary to force downwardly the bell crank lever 184 pivoted as at 185 by stepping upon the foot portion 186 whereupon the end 187 of this lever 184, which is beneath the enlarged portion 182, forces this portion upwardly to disengage the latch from the bar 23, whereupon the lever may again be permitted to rise and the weight of the cone will lower the same into position for tightening the belt, the operation all taking place from the front of the machine in a desired convenient location.

Simultaneously with the lowering of the bobbins 35 by manual movement of the yoke 135 by the lever 131 the bobbins 35 are further revolved on their spindles in a direction opposite to their normal rotation by a ratchet wheel 150 which is fast on one end of a shaft 151. On the other end of the shaft 151 is a gear 152 which meshes with the pinion 49 loosely rotatable on the main driven shaft 25. A pawl 154 is pivotally mounted on a suitable bracket and connected by means of a link 156 to the outer end extremity of an extension 157 formed on the lever 131. A spring 158 acts to hold the pawl 154 in operating position with respect to the inclined teeth of the ratchet wheel 150, but when the lever is in retracted position a projection on the opposite side of the pawl engages an adjustable stop 160 fixed on the frame to lift it out of engagement with the ratchet teeth during normal working operation of the machine. The device 160 may adjust the extent of picking motion of the pawl about the ratchet wheel 150 in order to vary the number of ratchet teeth engaged by the tip of the pawl 154. It will thus be seen that as the lever 131 is swung to drop the rail and the bobbins 35 to their doffing position that the bobbin will also be simultaneously revolved in a reverse direction about their axis during the lowering movement of the rail to provide additional slack of the yarn over that obtained during tilting of the spindles 60.

Figure 8:
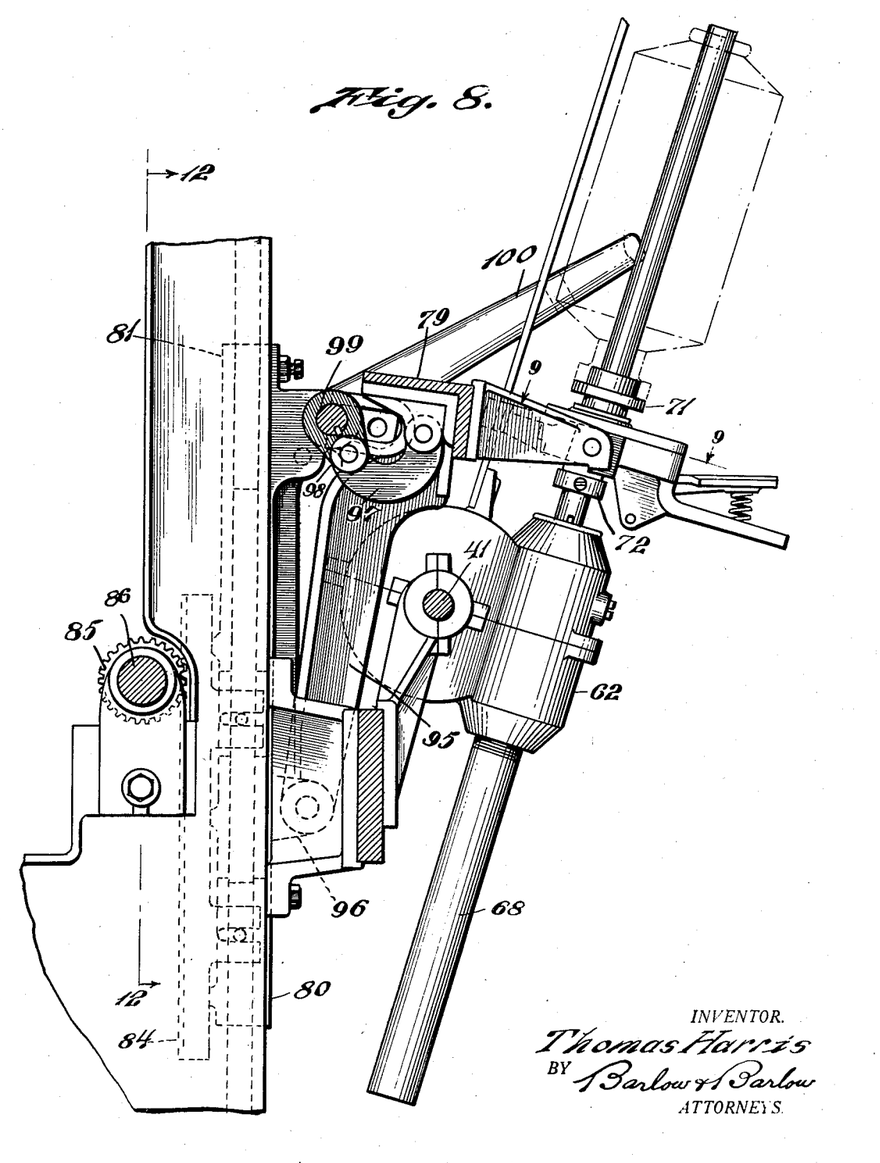
Fig. 8 is an enlarged detail view, partly in section, of the bobbin mechanism embodying my invention.

The spindle rail 79 is fixedly secured to the upper end of arm members 95, the lower end of which is pivotally mounted on brackets 96 affixed to the slides 81. A U-shaped link 97 is pivotally connected at one end to the upper end portion of each arm 95 adjacent to the spindle rail 79, while the link 97 has its opposite end pivoted to the outer end of one arm 98 of a bell crank lever fixed on a rod 99 which extends longitudinally of the machine to provide for several such arrangements 98, 97, 95. The other arm of the several bell crank levers 98 consists of a long narrow arm 100 which provides a convenient handle for imparting rocking movement to the rod 99 and in turn to the rail 79 in order to swing all of the bobbins 35 in unison about shaft 41 as a center to an outwardly inclined position, as shown in Fig. 8, to facilitate doffing.

The housing 62 of each bobbin unit is loosely mounted upon the main bobbin drive shaft 41 so that any outward swinging movement of the bobbin units by the handle 100 will serve to tilt the housings 62 on the shaft 41 as a center and thus rotate the spiral gear 69 through a partial turn in a direction opposite to its normal motion, as for example approximately two-thirds of a revolution, so as to impart to the same angular rotation to the bobbin spindle 60 and the bobbin 35 to provide sufficient slack to the yarn for piecing up of the ends when breakage occurs during winding, it being noted that this slack occurs whether one unit is swung outwardly or all of the units are swung outwardly together.

Figure 12:
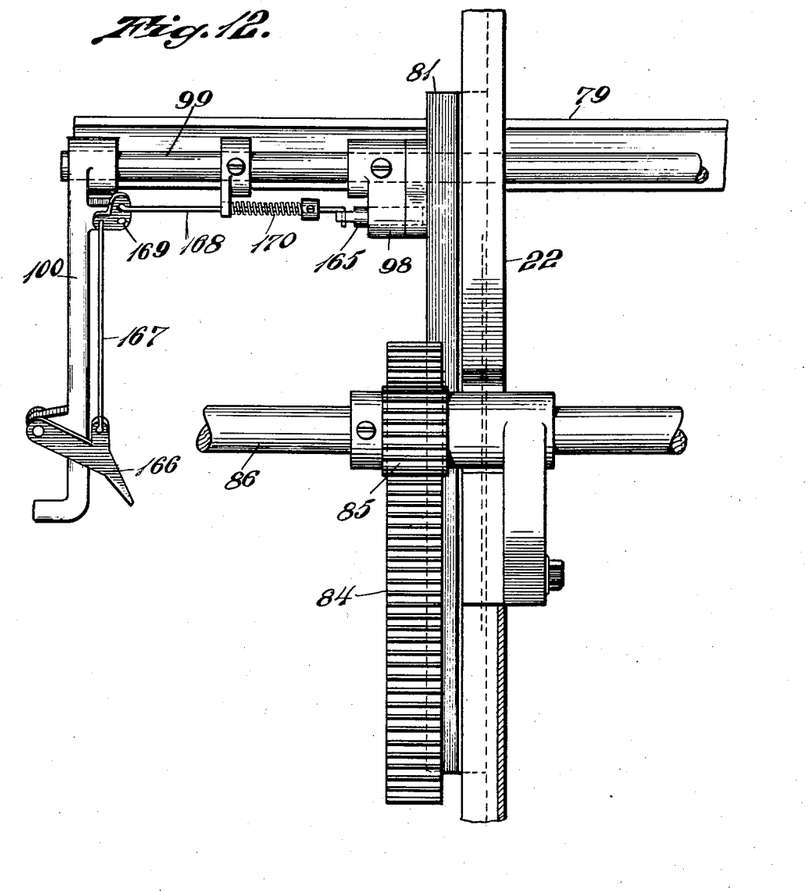
Fig. 12 is an enlarged detail elevational view of the bobbin tilting mechanism and taken on the line 12—12 of Fig. 8.

The slide member 81 of the carriage at one end thereof, as shown in Fig. 12, includes a retractile plunger 165 mounted in the arm 98 for sliding movement and is actuated by a hand lever 166, rods 167 and 168, and bell crank 169 to be withdrawn from a locking position with respect to the samson 22 and against the tension of the spring 170 to thereby permit the arm 95, rail 79 and the bobbins 35 to be tilted outwardly by the handle 100 for doffing.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a roving frame, means for rotating a spindle, a spindle driven by said means for rotating a bobbin, said spindle being axially movable relative to said means, means for moving said spindle axially relative to said means, and manual means for individually disconnecting said spindle from said moving means therefor to lower said spindle and the bobbin thereon.

2. In a roving frame, means for rotating a spindle, a spindle driven by said means for rotating a bobbin, a traverse rail, spaced arms secured to said rail, a spindle bearing, releasable pins carried by said bearing and engaging openings in said arm to detachably support said spindle on said rail, and means for withdrawing said pins from said arms to lower said spindle and the bobbin thereon.

3. In a roving frame, means for rotating a spindle, a spindle driven by said means for rotating a bobbin, said spindle being axially movable relative to said spindle rotating means, a traverse rail, a support for said spindle through which it is axially movable, and releasable means connecting said spindle to said rail to move the spindle in unison therewith, said means being manually disengageable from said rail when in its elevated positions to lower said spindle and bobbin thereon.

4. In a roving frame, a vertical spindle, driving means for said spindle including a shaft extending at right angles to the spindle, a casing for housing said means and maintaining said relation of spindle and shaft, said casing and spindle being rockable about the axis of said shaft as a center, and a spring normally acting on said casing to hold the spindle in a substantially vertical position and oppose rocking movement of the casing and the spindle to a position to facilitate piecing or doffing.

5. In a roving frame, a vertical spindle, driving means for said spindle including a shaft extending at right angles to the spindle, a casing for housing said means and maintaining said relation of spindle and shaft, said casing and spindle being rockable about the axis of said shaft as a center and said spindle being also axially movable while maintaining constant driving connection with said shaft, and a spring normally acting on said casing to hold the spindle in a substantially vertical position and oppose rocking movement of the casing and the spindle to a position to facilitate piecing or doffing.

6. In a roving frame, a shaft, a gear thereon, a spindle, means for supporting said spindle to be tilted outwardly about the axis of said shaft as a center, and a second gear meshing with said first gear and in turn driving said spindle therefrom, said spindle being rotated in a direction opposite from its normal rotary motion upon movement about the shaft as a center while the first said gear is stationary whereby sufficient slack is provided in the yarn to facilitate piecing of the ends.

7. In a roving frame, a shaft, a gear thereon, a spindle, means for supporting said spindle to move about said shaft as a center, a second gear meshing with said first gear and in turn driving said spindle therefrom, said spindle being rotated upon movement about the shaft as a center while the first said gear is stationary, and means to mechanically turn said spindle in the opposite direction from that moved by said rotation.

8. In a roving frame, a plurality of flyers, a plurality of spindles each adapted for mounting a bobbin for insertion into one of said flyers, power mechanism for traversing the spindles up and down, and manually operable means for independently operating portions of said power traverse mechanism for simultaneously lowering all of said spindles below said flyers and for swinging said spindles outwardly at an angle to the vertical.

9. In a roving frame, a plurality of flyers, a plurality of spindles each adapted for mounting a bobbin for insertion into one of said flyers, power mechanism for traversing the spindles up and down, and manually operable means for independently operating portions of said power traverse mechanism for simultaneously lowering all of said spindles below said flyers, and separate manually operable means for swinging said spindles outwardly at an angle to the vertical.

10. In a roving frame, a plurality of flyers, a plurality of spindles each adapted for mounting a bobbin for insertion into one of said flyers, power mechanism for traversing the spindles up and down, and manually operable means for independently operating portions of said power traverse mechanism for simultaneously lowering all of said spindles below said flyers, separate manually operable means for swinging said spindles outwardly at an angle to the vertical, and releasable means including a retractile spring pressed plunger to lock the last said means against movement.

11. In a roving frame, a plurality of flyers, a plurality of spindles each adapted for mounting a bobbin for insertion into one of said flyers, means for simultaneously lowering all of said spindles below said flyers and swinging said spindles outwardly at an angle to the vertical, said means also being arranged to act at the same time to reversely rotate each spindle to slacken said yarn.

12. In a roving frame, a plurality of flyers, a plurality of spindles each adapted for mounting a bobbin for insertion into one of said flyers, means for simultaneously lowering all of said spindles below said flyers and swinging said spindles outwardly at an angle to the vertical, and individual means arranged to act at the same time to reversely rotate each spindle to slacken said yarn.

13. In a roving or fly frame, the combination with a power driven builder mechanism acting automatically to alternately raise and lower the traverse rail carrying the bobbins, of means for actuating said builder mechanism after the power is disconnected from the latter to lower the traverse rail and the bobbins to a predetermined position to permit free doffing of the bobbins.

14. In a roving or fly frame, the combination with a power driven builder mechanism acting automatically to alternately raise and lower the traverse rail carrying the bobbins, of means for actuating said builder mechanism after the power is disconnected from the latter to lower the traverse rail and the bobbins to a predetermined position beyond their maximum low position reached when lowered by the power driven mechanism to permit free doffing of the bobbins.

15. In a roving or fly frame, the combination with a power driven builder mechanism acting automatically to alternately raise and lower the traverse rail carrying the bobbins, of manual means for actuating said builder mechanism after the power is disconnected from the latter to lower the traverse rail and the bobbins to a predetermined position to permit free doffing of the bobbins.

16. In a roving or fly frame, the combination with a power driven builder mechanism acting automatically to alternately raise and lower the traverse rail carrying the bobbins, of means for actuating said builder mechanism after the power is disconnected from the latter to lower the traverse rail and the bobbins to a predetermined position to permit free doffing of the bobbins, said means comprising pawl and ratchet wheel mechanism connectable with the power driven builder mechanism.

17. In a roving or fly frame having a power driven mechanism connected to a traverse rail carrying the yarn receivers to cause raising and lowering of the rail, of a plurality of vertically reciprocable slides, pivotally mounted arms thereon for supporting said rail, a bell crank lever pivotally mounted on one of said slides, and link means connecting said bell crank lever and the rail for causing outward swinging movement of the latter about the pivot point of said arms to bodily move all the bobbins simultaneously into an inclined position to permit doffing.

18. In a roving frame, a plurality of spindles, means for traversing said spindles up and down including a shaft, and means including a gear compound on the end of said shaft swingable about said shaft to further move said shaft when so swung to cause lowering movement of said spindles.

19. In a roving frame, a plurality of spindles, means for traversing said spindles up and down including a shaft, and means including a gear compound on the end of said shaft swingable about said shaft to further move said shaft when so swung, said latter means comprising a pair of gears one of which is loose on said shaft and the other tight thereon, intermediate gears connecting said gears to cause them to rotate in opposite directions, said loose gear when stationary acting as a rack so that when the gear compound is swung about said shaft as a center such movement serves to rotate the gear fixed on said shaft and causing lowering movement of said spindles.

20. In a roving frame, a plurality of spindles, means for traversing said spindles up and down including a shaft, and means including a gear compound on the end of said shaft swingable about said shaft to further move said shaft when so swung, said latter means comprising a pair of gears one of which is loose on said shaft and the other tight thereon, intermediate gears connecting said gears to cause them to rotate in opposite directions, said loose gear when stationary acting as a rack so that when the compound is swung about said shaft such movement serves to rotate the gear fixed on said shaft and cause lowering movement of said spindles, and means arranged to provide manually swinging movement of said intermediate gears.

21. In a roving frame, a plurality of spaced flyers positioned in substantial alignment along one side of the frame, gear means for driving said flyers, said gear means comprising a gear for each flyer in aligned arrangement, a common gear in each alternate space between flyers and having driving engagement with two of said aligned gears for rotating the flyers driven thereby.

22. In a roving frame, a plurality of spaced flyers positioned in substantial alignment along one side of the frame, gear means for driving said flyers, said gear means comprising a gear for each flyer in aligned arrangement, and common gears in aligned arrangement and being located in each alternate space between flyers and having driving engagement with two of said aligned gears for rotating the flyers driven thereby.

23. In a roving frame, means for rotating a spindle, a spindle driven by said means for rotating a bobbin, a traverse rail, and means connecting said spindle to said rail to move with the rail and relative to said spindle driving means, said means being disengageable from said rail to lower said spindle and bobbin thereon.

24. In a roving frame, spindle driving means including a shaft, a spindle, means for supporting said spindle to move about said shaft as a center, and means to drive said spindle from said shaft and maintain continual driving engagement therewith during said movement, said spindle being also axially movable while maintaining said driving engagement.

25. In a roving frame, a vertical spindle, driving means for said spindle including a shaft extending at right angles to the spindle, a casing for housing said means and maintaining said relation of spindle and shaft, said casing and spindle being rockable about the axis of said shaft as a center and said spindle being also axially movable while maintaining constant driving connection with said shaft.

THOMAS HARRIS.